United States Patent Office 3,151,098
Patented Sept. 29, 1964

3,151,098
POLYURETHANE ELASTOMERS STABILIZED WITH ALKYLENE-BIS-DITHIOCARBAMATE
John William Watson, Sutton Coldfield, Charles Edwin Kendall, Coleshill, and Wilfrid Henry Hogg, Sutton Coldfield, England, assignors to Dunlop Rubber Company Limited, London, England, a British company
No Drawing. Filed June 26, 1961, Ser. No. 119,297
Claims priority, application Great Britain, July 7, 1960, 23,730/60
7 Claims. (Cl. 260—45.9)

This invention relates to polyurethane elastomers.

The object of the invention is to improve the ageing properties of polyurethane elastomers, especially those containing chains of oxypropylene units.

According to the invention polyurethane elastomeric material comprises a dithiocarbamate compound of the general formula:

$$\begin{array}{c}R_1\\ \diagdown\\ R_2\end{array}N-CSS-A-SSC-N\begin{array}{c}R_3\\ \diagup\\ R_4\end{array}$$

where $R_1$, $R_2$, $R_3$ and $R_4$ are alkyl or aryl groups or hydrogen respectively and A is an alkylene or arylene group. Preferably each of the groups A, $R_1$, $R_2$, $R_3$ and $R_4$ contains from 1 to 8 carbon atoms and is non-reactive with isocyanate groups.

Reference herein to "isocyanate" groups includes the sulphur analogue, i.e. isothiocyanate groups. Similarly references to "polyether" and "polyol" include references to thioether and thiol compounds.

Polyurethane elastomeric material is prepared by reacting a polyol containing terminal or substantially terminal reactive groups with a polyisocyanate.

Dithiocarbamate compounds of the general formula:

$$\begin{array}{c}R_1\\ \diagdown\\ R_2\end{array}N-CSS-A-SSC-N\begin{array}{c}R_3\\ \diagup\\ R_4\end{array}$$

may be added to polyurethane elastomers in a wide range of amounts of from 0.01 percent to 5 percent of the weight of the polyol. Usually the amount employed is in the range of from 0.1 percent to 3 percent and preferably from 0.5 percent to 2 percent of the weight of the polyol.

The preferred dithiocarbamate compounds contain short aliphatic groups, especially in the alkylene group, i.e. the A, $R_1$, $R_2$, $R_3$ and $R_4$ groups and especially the A group possess from 1 to 4 carbon atoms. In general open molecular chain structures are preferred to cyclic structures and straight chain or unsubstituted cyclic structures are preferred to branch chain or substituted cyclic structures.

The dithiocarbamate compound can be added with any of the reactants or additives in the composition from which the polyurethane elastomeric material is prepared. Thus its addition may be made to the polyol, to the polyisocyanate, to an inert solvent or plasticiser which is added to the reactants, or to the catalyst employed. Usually the dithiocarbamate compound is incorporated in the composition to which the catalyst is added, that is to the polyol or, where a prepolymer process is employed, to the prepolymer obtained by initial reaction of the polyol with the polyisocyanate.

In cases where the dithiocarbamate compound as added is reactive with the polyisocyanate employed the direct addition thereof to the polyisocyanate should be avoided especially if the reaction product of the dithiocarbamate compound and the polyisocyanate is not completely soluble in the polyisocyanate.

Preferably the dithiocarbamate compound is added to the polyol and, where a prepolymer technique is employed, to the prepolymer containing terminal isocyanate groups prepared by reacting the polyol with a proportion of the total amount of polyisocyanate.

Alternatively and more especially in the case of foamed polyurethanes the dithiocarbamate compound may be applied to the hardened or partially hardened polyurethane material in the form of a dilute solution or dispersion. In the case of bulky polyurethane elastomeric articles this has the advantage that the outer surfaces, which are more liable to oxidative attack than is the interior, are preferentially protected.

The ageing resistant properties conferred by the dithiocarbamate compounds according to the invention result at least in part from the protection from oxidative attack which is afforded and in this connection it is believed that the dithiocarbamate compounds are effective in protecting secondary carbon links in polyether molecular chains of the polyurethane elastomers from oxidative attack. However, the ageing resistant properties conferred are not exclusive to polyurethane elastomers prepared from polyols having such secondary carbon links, for instance those containing repeated oxypropylene units forming a molecular chain having some dependent methyl groups, since the resistance to ageing of other polyurethane elastomers, for instance one prepared from polytetrahydrofuran, is also improved.

In the preparation of the polyurethane elastomers the preferred polyisocyanates are organic diisocyanates.

The resistance to discolouration of polyurethane elastomers upon exposure to light may be enhanced by employing aliphatic polyisocyanates in their preparation: in the case of foamed material by employing a peroxide as described in co-pending application of Hogg et al. Ser. No. 119,272 filed June 26, 1961 and in the case of films and threads as described in co-pending application of Watson et al. Ser. No. 119,296 filed June 26, 1961 by employing a catalyst as therein defined. In addition the preparation may comprise the sequential reaction of the aliphatic polyisocyanate with a diol and a polyfunctional polyol such as a triol as described in the co-pending application Ser. No. 119,296 and co-pending application of Watson et al. Ser. No. 137,750 filed September 13, 1961.

The invention will be described with reference to the following examples in which the parts are by weight:

*Example I*

100 parts of a polytetramethylene ether glycol having a mean molecular weight of approximately 300, available as Teracol 30, were dehydrated by heating at 110° C. to 120° C. with stirring under reduced pressure in an atmosphere of pure nitrogen for 2 hours. The temperature was reduced to 100° C. and 26.25 parts of dicyclo hexyl-methane diisocyanate were added and the mixture heated at 100° C. for 2 hours and then cooled.

A water-white prepolymer syrup having a viscosity at 25° C. of 45,000 centipoises was obtained.

To 100 parts of the prepolymer were added 0.5 part of anhydrous trimethylol propane and 0.1 part of dibutyl tin dilaurate and the amounts respectively noted below of the alkylene bis dialkyl dithiocarbamates or, for purposes of comparison therewith, of tetraalkyl thiuram disulphides.

The respecitve compositions were poured onto carefully levelled shallow plate glass trays and the solvents allowed to evaporate for 45 minutes at room temperature. The trays were then transferred to an oven and heated at 100° C. for ten minutes when the compositions were observed to have gelled to elastomeric films some 0.010 inch in thickness. Heating was continued for a further 50 minutes to ensure completion of the reactions.

The films were stripped from the glass supports and clear, water-white elastic films were obtained.

The tensile strengths of the films was determined and the films then aged in an oven at 135° C. for 2 hours. The tensile strengths of the films were again determined and their colour noted. The results are given below, the respective films being identified by the group A and R groups in the dithiocarbamate, or disulphide, additive.

| Percent additive | Group A | R groups | Percent strength loss on ageing | Colour after ageing |
|---|---|---|---|---|
| 0.5 | $CH_2$ | $C_4H_9$ | Nil | Very slight discolouration |
| 1.0 | $C_2H_4$ | $C_2H_5$ | 22 | Slight discln. |
| 1.0 | $C_2H_4$ | $C_4H_9$ | 80 | Do. |
| 1.0 | $C_4H_8$ | $C_2H_5$ | 87 | Do. |
| 1.0 | $C_4H_8$ | $C_4H_9$ | 100 | Do. |
| 1.0 | Absent | $C_2H_5$ | 31 | Greatly discld. |
| 1.0 | do | $CH_3$ | 46 | Do. |
| Nil | | | 100 | Very dark. |

Example 2

200 parts of Teracol 30, a polytetramethylene ether glycol of approximately 3,000 molecular weight, were dehydrated by heating under vacuum except for a very slow bleed of pure nitrogen, for 2 hours at 110°–120° C. with stirring. The temperature was lowered to 100° C. and then kept constant, and the stirring and nitrogen bleed continued, during the addition of:

11.2 parts of hexamethylene diisocyanate over a period of 1 hour. Heating and stirring was continued for a further 2 hours and a further 22.4 parts of hexamethylene diisocyanate were added. After continuing the heating at 100° C. and stirring for a further 2 hours, the product was allowed to cool, yielding water-white syrup of viscosity 50,000 cps. at 25° C.

To 100 parts of the syrup were added:

0.5 part of anhydrous trimethylol propane and 0.1 part of dibutyl tin dilaurate, both as 3 percent solutions in dry acetone, together with 1 part of methylene-bis-dibutyl dithiocarbamate as antioxidant.

A suitable quantity of the liquid mixture was poured into a carefully leveled shallow plate glass tray, and the solvents allowed to evaporate at room temperature for 45 minutes. The tray was then placed in an oven at 100° C. for 10 minutes, after which the composition had gelled to an elastomeric film approximately 0.010 inch thick. Heating was continued for 50 minutes to ensure completion of the reactions. After soaking in water to enable the film to be stripped from the glass support, it was allowed to dry. A clear, water-white elastic film was obtained.

For purposes of comparison a similar film was produced without the inclusion of the methylene-bis-dibutyl dithiocarbamate.

The films were heated in an oven at 135° C. for 2 hours. The film containing no antioxidant was severely degraded by the heat treatment; whereas with the antioxidant present, degradation of the film was negligible.

| | Tensile strength, kg./cm.² | Modulus at 300% elong., kg./cm.² | Elongation at break, percent |
|---|---|---|---|
| Original film | 370 | 26 | 820 |
| Heat-treated film | 371 | 38 | 837 |

Example 3

100 parts of polypropylene ether diol having a hydroxyl value 53.8 were dehydrated by the procedure described in Example 1. With the diol at 25° C., 12 parts of toluene diisocyanate (80/20 2:4/2:6-isomer ratio) were added at a steady rate over a period of 10 minutes. The temperature of the mixture was steadily raised to 105° C. over a period of one hour and maintained at this temperature for a further 3 hours.

20 parts of toluene diisocyanate were then added at a steady rate over a period of one hour with the temperature still maintained at 105° C. The product was allowed to cool, yielding a syrup of viscosity 15,000 cps. at 25° C.

Films were prepared from the syrup using the procedure described in Example 1, except that the antioxidant used was butylene-bis-dibutyl dithiocarbamate. The films were heated in an oven at 135° C. for 2 hours. The tensile strength of the film containing no antioxidant was reduced by the heat treatment; whereas with the antioxidant present, degradation of the film was negligible:

| | Tensile strength, kg./cm.² | Modulus at 300% elong., kg./cm.² | Elongation at break, percent |
|---|---|---|---|
| Original film without antioxidant | 114 | 47 | 567 |
| Heat-treated film without antioxidant | 85 | 47 | 576 |
| Original film with antioxidant | 114 | 64 | 497 |
| Heat-treated film with antioxidant | 123 | 61 | 503 |

Example 4

100 parts of polypropylene glycol of hydroxyl value 54 and water content of 0.3 percent were stirred in a stainless steel jacketed reactor under an atmosphere of nitrogen and, 12.1 parts of Suprasec E, a mixture of 80 percent of 2:4 toluene diisocyanate and 20 percent of 2:6 toluene diisocyanate were added gradually over 10 minutes. The temperature was raised steadily to 105° C. in 40 minutes and maintained at this temperature for three hours.

20 parts of Suprasec E were then added at a steady rate over 55 minutes and the temperature of the mixture then lowered to 30° C.

The NCO content was determined by analysis and adjusted to 8.5 percent by stirring in a further 3.3 parts of Suprasec E.

To 100 parts of the syrup so produced was added:

1 part of methylene-bis-dibutyl dithiocarbamate and the mixture stirred for a few minutes until the dithiocarbamate had dissolved. The following ingredients were then mixed simultaneously into the solution so prepared by means of a high speed stirrer:

3 parts of water, 0.5 part of silicone oil of 50 centipoise viscosity, 1 part of N-methylmorpholine, 0.3 part of triethylamine.

The mixture was poured into a mould where it is foamed and set in 2½ minutes. After maturing at room temperature for several days the product was a soft resilient foam of 0.044 g./cc. density.

For purposes of comparison a control foam was made from the same prepolymer syrup but without adding dithiocarbamate.

Initially the two foams were both water-white and of high tensile strength. On exposure to daylight, including some direct sunlight, for three months, the control foam acquired a pale brown surface discolouration and its surface layers weakened appreciably.

The foam containing the dithiocarbamate only yellowed to a slight extent and its surface layers lost little or no strength, under the same conditions of exposure.

Example 5

1 part of methylene-bis-dibutyl dithiocarbamate was dissolved in, 100 parts of approximately 3,000 m.wt. polyoxypropylene triol sold under the trade name of "Niax LG–56 Triol." This solution was stirred for 7 seconds on an 840 r.p.m. stirrer with:

2.9 parts of water, 0.5 part of X–520 water-soluble silicone (Union Carbide) and 1 part of dibutyl tin dilaurate. The resulting mixture was stirred for a further 7 seconds with 38 parts of Suprasec E.

The resulting cream was immediately poured into a mould where it foamed and gelled within 5 minutes. The resulting foam was then heated for 8 minutes in a hot air oven at 70° C.

The product was a medium hard resilient foam. A similar foam without the dithiocarbamate was prepared as a control.

Both foams were initially water-white and of high tensile strength. After heating for 16 hours in an oven at 125° C. both foams showed brown discolouration but this was less marked in the foam containing dithiocarbamate. There was complete loss of strength in the control foam which degenerated to a crumbly mass, whereas the protected foam only showed a moderate weakening.

Having now described our invention, what we claim is:

1. Polyurethane elastomeric material comprising a polyurethane elastomer prepared by reacting a polyether polyol with an organic polyisocyanate and an ageing-resistant agent comprising a dithiocarbamate of the general formula

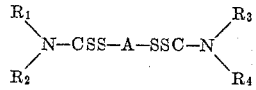

wherein each of $R_1$, $R_2$, $R_3$, and $R_4$ is a member selected from the class consisting of alkyl radicals containing up to 8 carbon atoms, aryl radicals and hydrogen but wherein at least one of said R groups is a member other than hydrogen, and A is an alkylene radical containing up to 4 carbon atoms, said dithiocarbamate being present in an amount of 0.1 percent to 3 percent based on the weight of the polyether polyol used to prepare the polyurethane elastomer.

2. Polyurethane elastomeric material according to claim 1 wherein the amount of the dithiocarbamate compound is from 0.5 percent to 2 percent based on the weight of the polyether polyol.

3. Polyurethane elastomeric material according to claim 1 wherein each of $R_1$, $R_2$, $R_3$ and $R_4$ is an alkyl radical containing 1 to 4 carbon atoms.

4. Polyurethane elastomeric material according to claim 1 wherein each of $R_1$, $R_2$, $R_3$ and $R_4$ is an aliphatic hydrocarbon group having an open molecular chain structure, and A is an alkylene group having an open molecular chain structure.

5. Polyurethane elastomeric material according to claim 1 wherein each of $R_1$, $R_2$, $R_3$, $R_4$ is an aliphatic group having a straight molecular chain structure, and A is an alkylene group having a straight molecular chain structure.

6. Polyurethane elastomeric material according to claim 1 wherein the organic polyisocyanate is an aromatic polyisocyanate.

7. Polyurethane elastomeric material according to claim 1 wherein the organic polyisocyanate is an aliphatic diisocyanate.

References Cited in the file of this patent
UNITED STATES PATENTS

| | | |
|---|---|---|
| 2,889,307 | Clayton | June 2, 1959 |
| 2,915,496 | Swart et al. | Dec. 1, 1959 |
| 3,004,496 | Chevassus | Oct. 17, 1961 |
| 3,058,941 | Birum | Oct. 16, 1962 |